Inventors: Gerrit H. Reman
Benny Zietse
By: Oswald H. Milmore
Their Attorney

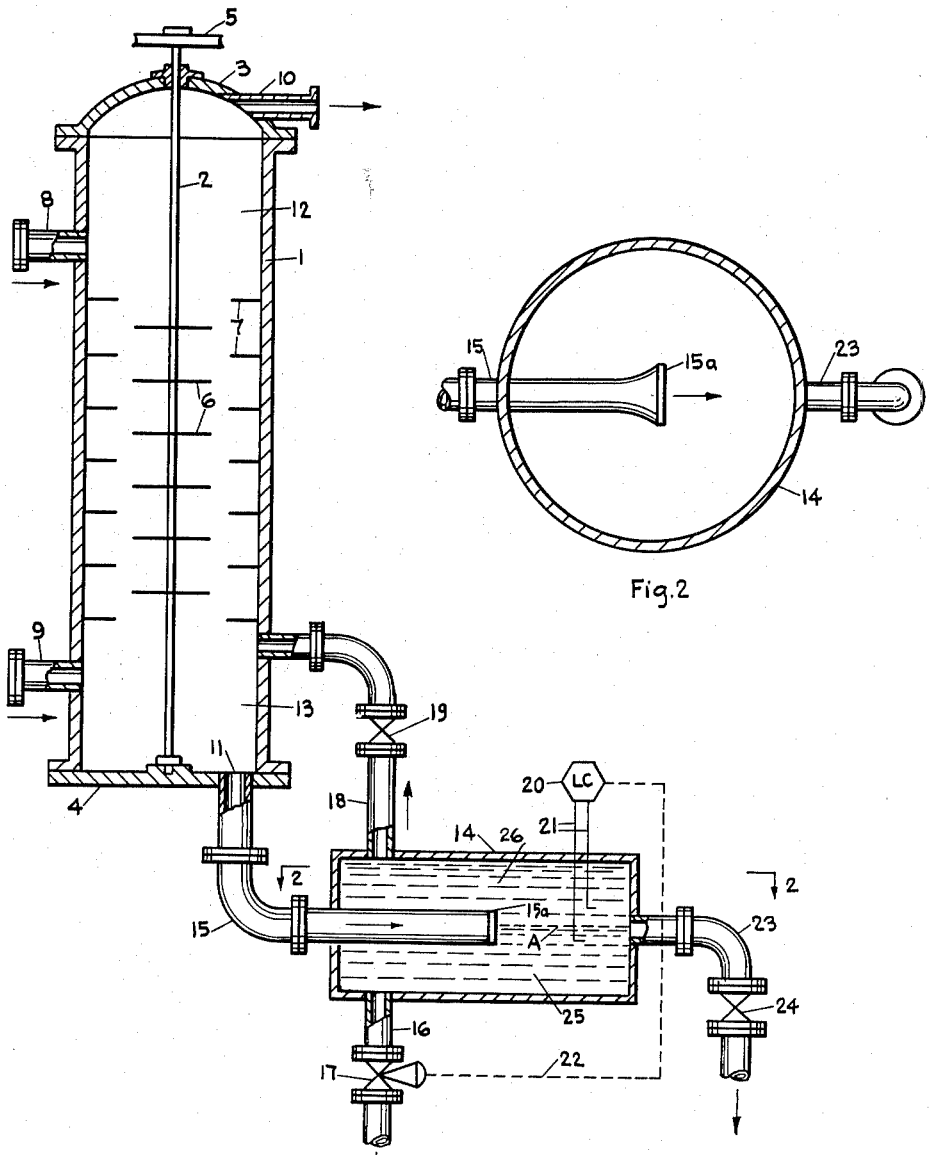

United States Patent Office 2,729,549
Patented Jan. 3, 1956

2,729,549

METHOD AND APPARATUS FOR CONTACTING AND SEPARATING LIQUID PHASES BY SETTLING

Gerrit H. Reman and Benny Zietse, Amsterdam, Netherlands, assignors to Shell Development Company, Emeryville, Calif., a corporation of Delaware Application September 22, 1951, Serial No. 247,884

Claims priority, application Netherlands September 29, 1950

19 Claims. (Cl. 23—310)

This invention relates to the art of treating dispersions of liquid phases. More particularly, it relates to a process and apparatus of bringing into contact with each other, and subsequently separating, two liquid phases that are at least partially immiscible and have different densities, and may be applied, for example, in the solvent extraction art wherein a liquid mixture is separated into its components or group of components by extraction with a selective solvent for certain of said components. The invention further relates to an improved process and apparatus for separating the components of a dispersion of one liquid phase in a continuous liquid phase, which may be a dispersion resulting from a solvent extraction process or a dispersion obtained from some other process or a naturally occurring dispersion.

The invention is particularly useful in handling liquid dispersions that tend to form small amounts of a third phase containing substances of intermediate density, sometimes known as "rag," that tends to collect at a level interface between the main liquids forming the dispersion when the latter is settled.

In extracting a liquid mixture with one or more solvents it frequently happens that substances are separated which are not soluble in either of the two liquid phases that occur in the extraction zone. For instance, when lemon or orange oil is to be extracted (which extraction is frequently carried out with two immiscible, or only partly miscible liquid solvents flowed countercurrently to one another through a multi-stage countercurrent extraction apparatus), slimy substances separate out of the liquid. Similarly, in the extraction of crude mixtures of sodium alkyl sulfates produced by neutralizing the sulfation product of cracked wax olefins of 10–18 carbon atoms, using gasoline as the selective solvent to extract the unreacted hydrocarbons and polymers, there appears a slimy layer containing, inter alia, iron compounds. Further, in the extraction of lubricating oil distillates with furfural small quantities of asphaltenes are frequently separated.

The polymerization of polyvinyl chloride by bringing vinyl chloride into contact with an aqueous phase, in which process the polyvinyl chloride formed is separated with the aqueous phase of the unpolymerized vinyl chloride, may give rise to a third phase containing undesired impurities and/or part of the polyvinyl chloride formed. From the point of view of separation of the liquid phases, both the impurities and the separated polyvinyl chloride are separate phases.

Such dispersions resulting from the treatment of a liquid mixture with a solvent, or from chemical reaction or naturally occurring dispersions, as a rule consist of only two principal liquid phases together with smaller amounts of a third phase that separates out from the principal liquid phases and which substances are herein for convenience referred to as "pollution" or "impurities"; in exceptional cases such dispersions may contain more than two liquid phases and the invention is equally applicable to such dispersions.

These impurities, as a rule, accumulate in the settlers at the interface between the liquid phases and thus impede a ready coalescence of the drops of the dispersed phase occurring in the settling process. This accumulation occurs particularly when an extraction is carried out in multi-stage apparatus containing a number of mixers and settlers arranged in a series.

When the extraction is carried out in a packed column, e. g., when a column filled with Raschig rings is used, the impurities settle on the packing, which makes it necessary to interrupt the extraction from time to time in order to clean the apparatus.

The present invention now shows the measures to be taken in the above-mentioned processes, particularly in the case of extraction, if a third (polluted) phase separates off, in order to prevent fouling of the apparatus and consequent frequent interruption of the treatment to clean the apparatus, and at the same time to insure a ready coalescence of the dispersed phase, when using a relatively small settler.

In summary, according to the invention, the principal liquid phases are contacted in a strong flow contacting apparatus wherein the phases are maintained in motion which is sufficiently rapid to prevent the formation of continuous liquid phases in any part of the contact zone as well as to prevent the deposition of the impurities on any parts of the apparatus; the dispersion withdrawn from the contact zone is enriched with respect to the dispersed liquid phase; and the concentrated dispersion is introduced into the settler at the level of the interface between the layers of the principal liquid phases therein with a substantial horizontal velocity component, without more than a minor amount of the continuous phase, whereby the dispersed droplets can flow upwards or downwards, as the case may be, to coalesce with the layer of like composition in the settler without passing vertically through the interface and without passing through any layer of impurities that may collect as an intermediate third phase between the layers of the principal liquid phtases. The steps of concentrating the dispersion with respect to the dispersed liquid phase and admitting it to the interface in the settler in the manner stated may be applied also to settle dispersions obtained from sources other than contacting processes.

The complete process and apparatus of the invention, as applied to contacting and separating, are characterized by the following measures:

a. Use of a contacting zone in which strong flow takes place, so that throughout the zone one of the phases is present in the dispersed form, whereby there is no interface between two continuous liquid phases, and throughout which zone the flow of the phases is so strong as to obviate deposit of impurities. Such a zone will, in general, effect complete or practically complete contact between the liquid phases; in the case of extraction processes, wherein an exchange of components between the phases takes place such a zone is sometimes known as an extraction zone.

b. Use of a settler in which the drops of the dispersed phase coalesce in such a manner that they need not pass in contacting flow through the phase containing the impurities or through a polluted interface.

c. The absence of flow or of only a weak flow of the continuous phase to the settler in question.

Although some of the measures indicated above are known separately (but not in connection with the treatment of dispersions of the kind considered herein) it is only the combination of all the measures given above which produces the desired result of permitting uninterrupted operation of a contacting process, and it is only the combination of measures b and c in combination which produces the desired result of permitting uninterrupted settling of such dispersions. In connection with these measures the following additional remarks may be made:

Ad a. In the contact zone no interface must be formed between two continuous phases, which implies that an apparatus using mixers and settlers is not suitable for the purpose of extracting liquid phases of the character described. The same objection applies, for instance, to the apparatus described in U. S. Patent No. 2,011,186, in which an interface is formed between two continuous liquid phases in each compartment of the column. Nor is it desirable to use a packed column, since in this type of column the flow of the liquids is so hampered in many places that impurities are deposited, for instance, on the packing. Suitable contact zones for the purpose in view are those formed by columns without any packing in which, for example, one phase is sprayed into the other, the so-called "spray columns," and in particular contact zones equipped with rotating bodies causing strong flow, whereby one phase is kept dispersed in the other throughout the whole contact zone. Such zones, which are particularly suitable for extraction, are, for example, described in U. S. Patent No. 2,013,663, and in U. S. Patent No. 2,601,674 to Gerrit H. Reman, one of the joint inventors herein. From this type of contact zone, on the one hand, a continuous phase is drawn off at one level, which phase may contain a small quantity of drops of the dispersed phase, and, on the other hand, drops of the dispersed phase, together with a small quantity of the continuous phase, are drawn off at another level. The interface between the continuous phases must, of course, be formed outside of the contact zone.

Ad b and c. These measures relate to the use of the settler for the coalescence of the drops of the dispersed phase, and the manner in which these drops should coalesce. Only one settler is, as a rule, required for the coalescence of the dispersed phase; if there is more than one dispersed phase, it may sometimes be necessary to use more settlers. This settler (or settlers) must satisfy the requirements stated; this, however, is not strictly necessary for the collecting vessel frequently used in addition for the continuous phase.

If, for example, in the apparatus shown in Fig. 1 of the aforesaid Patent No. 2,601,674, the heavy phase is dispersed in the light phase and the interface between the continuous phases is allowed to form at the bottom of the column, the drops of the dispersed heavy phase have to pass through the interface to be able to join the principal mass of the heavy phase being discharged from the bottom of the column. The impurities, however, accumulate as a rule in the interface between the two continuous phases, so that the drops have to penetrate through a layer of the "polluted" phase before they can coalesce and join the continuous heavy phase at the bottom. This layer of impurities, however, obviates ready coalescence of the drops and prevents them from rapidly joining the dispersed phase. This interferes with adequate separation of the two liquid phases and, as a rule, necessitates the use of a relatively large settler. This is also the case if the light phase is dispersed in the heavy phase and the interface is at the top of the column. The same applies to other apparatus referred to under a, even when the interface is formed outside of the contact or extraction column proper, as when an external settler is used.

To insure the coalescence of the drops of the dispersed phase it is in the first place essential that there should be no necessity for the drops to traverse the "polluted" interface of the two liquid phases. This may be attained, for example, by causing the drops to impinge on a clean portion of the interface, or by feeding the drops to the settler on a level with the interface with a substantial horizontal velocity component. If this is carried out effectively, it is possible to insure that the impurities accumulating in the interface are washed away by the stream of drops itself at the place of introduction, as a result of which a clean interface is obtained in situ and adequate coalescence of the drops is made possible.

Furthermore, it is essential that the quantity of the continuous phase which, together with the dispersed phase, flows into the settler, be kept small. This does not imply that there should be no continuous phase or only a small quantity thereof in the settler or in the feed line to the settler; on the contrary, this feed line and the settler will, as a rule, contain even fairly large quantities of the continuous phase, but the transport of the continuous phase into the settler and particularly into the interface should be restricted. When, for example, the present method of working is compared with one stage of an extraction carried out in an extraction apparatus equipped with a series of mixers and settlers, the difference is striking: the dispersion, formed in the mixer, of the dispersed phase in the continuous phase, is conducted in its entirety to a settler, wherein the separation into phases must take place. In whatever manner the dispersion is conducted to the settler, a large portion of the drops of the dispersed phase must, prior to complete coalescence, pass through the intermediate layer of impurities formed in the settler. This difficulty is not encountered in the present process, since the dispersion is enriched or concentrated with respect to the dispersed phase and only the resulting concentrate is admitted into the interface of the settler; the dispersed drops can coalesce directly and join the principal layer or mass of the corresponding liquid phase in the settler without being hindered by the flow of the continuous phase.

If the impurities together with the drops of the dispersed phase should be carried along by a large quantity of continuous phase, coalescence of the drops and combination of the drops with the principal mass of the corresponding phase would not be effected in good time, so that even with the appropriate method of feeding and a locally "clean" interface, the greater part of the drops would have to pass through a "polluted" portion of the interface.

Having thus indicated the nature of the invention, the practical application thereof will be further described with reference to the accompanying drawings forming a part of this specification and showing certain illustrative embodiments thereof, in which:

Fig. 1 is a vertical central section through a contactor and a settler embodying the invention;

Fig. 2 is a horizontal section through the settler, taken on line 2—2 on Fig. 1.

Figure 3:
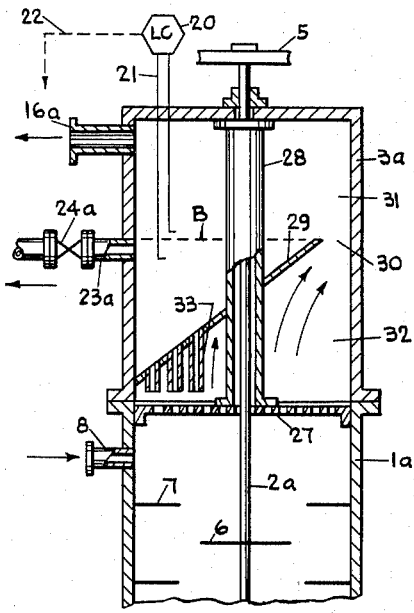
Figs. 3, 4 and 5 are fragmentary vertical central section views through the upper parts of contactors showing three modifications of settlers mounted within the column.

Referring to Figs. 1 and 2, a vertical column or tube of circular cross section and cylindrical shape is indicated at 1. A coaxial rotor shaft 2 is journalled in suitable bearings mounted in the top and bottom closures 3 and 4 and has drive means, such as a pulley 5, by which it may be rotated by a belt, not shown. A plurality of circular, rotor discs 6 which may be of thin material, are fixed to the shaft for rotation therewith with their plane surfaces perpendicular to the shaft axis. The inner wall of the column is equipped with thin annular horizontal stator rings or baffles 7, likewise having plane surfaces and formed with central openings, for dividing the column into a vertical series of intercommunicating compartments. The rotor discs may be situated half-way between each pair of adjoining stator baffles. Suitable inlets for the liquid phases to be contacted are provided; when the column is intended for countercurrent contacting the inlets 8 and 9 for the light and heavy liquid phases are at the top and bottom, respectively, displaced somewhat in from the end closures, and just beyond the uppermost and lowermost stator baffles. The part of the column occupied by the stator baffles and rotor discs is the contacting zone proper. Outlets 10 and 11 at the upper and lower ends are spaced vertically from the contacting zone to provide quiescent spaces or zones 12 and 13.

The operation of such a contactor is described in detail in the aforesaid Patent No. 2,601,674. In summary, the liquid phases traverse the compartments of the contacting zone in countercurrent. Rotation of the discs imparts an additional movement to the phases, causing them to rotate about the tube axis and setting up centrifugal force, particularly at the level of each rotor disc, which causes the phases to move outwards to the column wall where the phases are induced to change direction and move in part upwards and in part downwards toward the stator baffles. They then return radially inwards toward the rotor shaft flowing in the neighborhood of the stator baffles, again change direction, and move toward the rotor discs. The phases are for the greater part recirculated within each compartment, and only a part of the material flows from compartment to compartment; hence, the motion of the phases is generally toroidal, forming vortex patterns. This flow sets up shearing forces, resulting in a fine dispersion of one liquid phase within the other. Moreover, this flow is so strong that no deposition of impurities occurs on the surfaces of the rotor discs or stator baffles. Operation of the contactor, therefore, satisfies the requirement stated under *a*, supra.

The column may be operated as desired to effect a dispersion of the light liquid phase in the heavy liquid phase or to effect a dispersion of the heavy liquid phase in the light liquid phase. In the former case the column is initially filled with heavy liquid, which forms the continuous phase, and light liquid is thereafter introduced through the inlet 9 while rotating the shaft and rotor discs and continuing the admission of heavy liquid through inlet 8. In the latter case the column is initially filled with light liquid.

The settler 14 is connected to the outlet 11 at the bottom through a conduit 15 having a flat nozzle 15a. This arrangement is suitable for an operation in which the light liquid phase is the continuous phase and the heavy liquid phase is dispersed. The conduit 15 discharges horizontally into the settler at an intermediate level. The settler may be at any desired plan, for example, circular as shown. A heavy liquid phase discharge line 16 is connected to the settler at a level below the conduit 15 and is provided with a flow control valve 17 for regulating the discharge rate. A light liquid phase return line 18, which may if desired be provided with a flow control valve 19, is connected to the settler above the said intermediate level and to the column at a level preferably near the top of the quiescent zone 13.. The interface A within the settler may be maintained at the level of the conduit 15 by operation of the valve 17, which may be manually operated by reference to a sight glass, now shown; for automatic operation it is preferred to provide a liquid level controller 20 having suitable sensing elements 21 and connected by a control line 22 to actuate the valve 17. A drawoff pipe 23 having a valve 24 may be connected to the settler at about the level of the conduit 15 for removing the polluted third phase or rag intermittently or continuously.

In operation, the raw light liquid is admitted continuously through the lower inlet 9 and forms the continuous phase; the raw heavy liquid, admitted continuously through the upper inlet 8, is dispersed throughout the contact zone. The continuous light phase rises through the upper quiescent zone, usually carrying with it some drops of dispersed heavy liquid phase which settle downwards. The contacted light liquid is withdrawn through the outlet 10, usually free from dispersed drops, but under some conditions together with such amounts of dispersed liquids as may occur at the top of the quiescent zone. The dispersed drops settle through the contact zone and enter the lower quiescent zone 13 which is a quiet flow zone. The drops settle through the continuous light liquid phase due to their greater density; thereby a preferential transport of the dispersed liquid phase is effected and the dispersed drops are concentrated. This enrichment of the dispersion with respect to the dispersed liquid may be accompanied by some coalescence of the dispersed droplets into larger drops; however, no continuous layer of heavy phase is permitted to form either in the column 1 or in the conduit 15.

The enriched dispersion is admitted to the settler at the level of the interface A substantially horizontally with no more than a minor amount of the continuous phase. The concentrated dispersed droplets settle into the continuous layer 25 of heavy liquid in the bottom of the settler, from which the liquid is withdrawn through the discharge line 16 at a rate determined by the valve 17 in response to the position of the interface level as measured by liquid level controller 20. Light liquid phase rises to the continuous layer 26 from which it is returned to the column via return line 18.

The quantity of continuous, light phase flowing into the settler with the dispersed drops can be readily adjusted by controlling the level of the interface A. Thus, in the closed circuit including the conduit 15, settler 14, return line 18 and zone 13, there is a hydrostatic unbalance tending to cause circulation in the direction of the arrows indicated. The magnitude of this unbalance can be varied by changing the height of the interface which should, however, always be maintained close to the nozzle 15a. For best results the level should be near the center of the nozzle 15a. By raising the level of the interface the supply of the continuous phase is cut off almost entirely; by lowering this level the flow is increased. When, as in the illustrated embodiment, the height of the nozzle 15a is not adjustable, it is advantageous to control the circulation by means of a flow restrictive element, such as the throttle valve 19. Regardless of the control means employed, the best result is obtained by so regulating the circulation that the amount of continuous phase admitted to the settler is at a minimum without causing the formation of a continuous layer of the dispersed liquid phase in the column or in the conduit 15.

The third phase containing the impurities collects between the layers 25 and 26; if not removed if often forms a rag several inches in thickness. This rag is continuously swept away from the nozzle 15a by discharging the enriched dispersion with a horizontal velocity. Moreover, this action is aided by arranging the settler as shown, with the flow directed away from the points at which the outlet lines 16 and 18 are connected. The rag is prevented from building up to sizeable thickness by removing it periodically or continuously through the outlet 23; it may also be discharged together with one of the settled liquids, e. g., by occasionally opening the valve 17 to drain all heavy liquid therefrom.

It is evident that the same construction may be employed when the light phase is dispersed in the heavy phase; in this case the settler is inverted and connected to the outlet 10. The interface is, in this case, above the contact zone, and the level thereof is preferably regulated by controlling the efflux of continuous liquid phase from the outlet 11.

Figure 4:
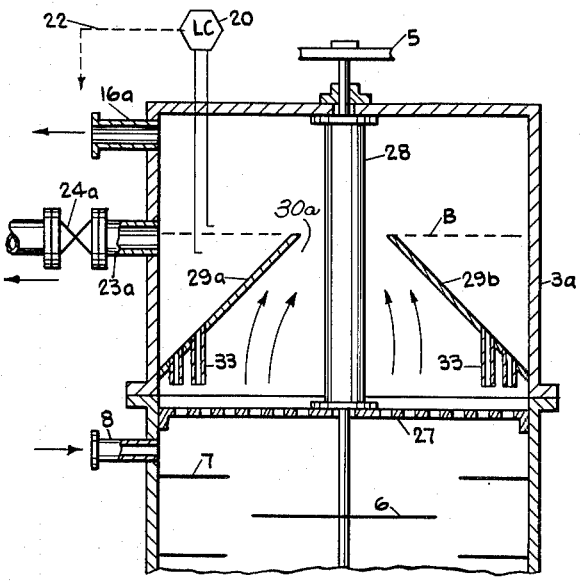
Figure 5:
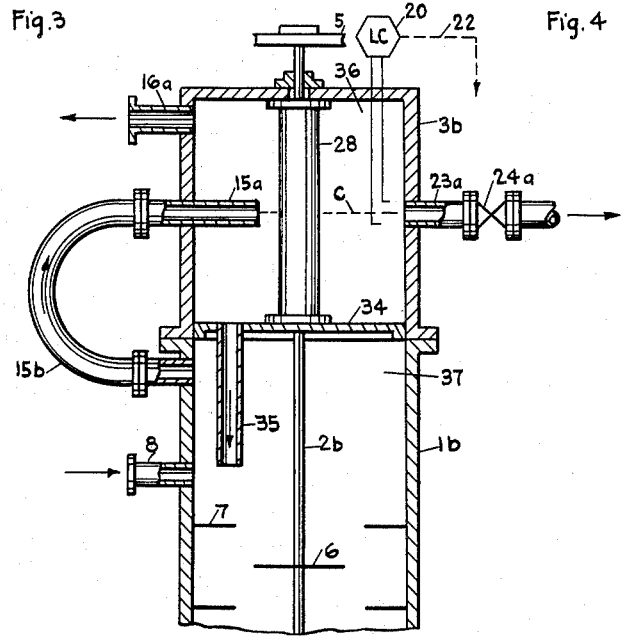

Figs. 3–5 show three alternate arrangements wherein the settler is within the column or an extension thereof and the column is adapted for operation with the interface at the top with the heavy liquid phase dispersed; each of these arrangements could also be adapted for operation with the interface at the bottom as described for Figs. 1 and 2 by inverting the settlers and partitions and locating them at the bottom of the column. It should be understood that the parts of the contactors not shown may be constructed as shown in Fig. 1.

Referring to Fig. 3, the upper part of the column is shown at 1a. The top closure 3a has cylindrical side walls and forms a chamber or housing. A perforated partition 27 may optionally be mounted at the top of the contacting zone which contains the rotor discs 6 and the annular stationary baffles 7. The rotor shaft 2a to which the rotor discs are fixed extends through the top closure, within which may, if desired, be surrounded by a small diameter stationary tube 28, for preventing the rotation of the shaft from affecting the fluid phases. The inlet 8 for the heavy liquid is located at the top of the contacting section and the liquid level controller 20 has the sensing elements 21 thereof extending into the settling zone and the control line 22 connected to the heavy liquid phase outlet valve (not shown) at the bottom of the column.

An inclined partition wall 29 extends substantially across the column, leaving an opening 30 at the upper margin thereof; this wall divides the upper part of the column within the closure 3a into a settling zone 31 and a zone of quiet flow 32, the latter being in free communication with the contacting zones through the perforations of the perforated plate 27. The opening 30 affords communication between the zones 31 and 32 and is preferably located at the side of the column away from the outlet 16a for the settled dispersed (light) liquid phases. A plurality of downcomers 33 at the lower side of the wall 29 extend into the zone 32 to a level spaced from the wall for returning settled heavy liquid phase from the settler. A drawoff pipe 23a having a valve 24a is connected at the height of the intended interface level B, which is at or near to the level of the opening 30.

In operation, the dispersion from the contacting zone rises into the quiet flow zone 32 through the perforated plate 27. This plate, while optional, assists in reducing turbulence in the zone 32. In ascending through the latter, the droplets of dispersed light liquid phase rise more rapidly than the continuous heavy liquid phase, being thereby transported preferentially and concentrated. The continuous phase in this zone may be substantially free from flow, particularly in the upper parts of the zone. The rising droplets, on striking the lower face of the wall 29 are deflected and in part coalesced into larger drops which pass upwards along the wall to the opening 30. There they are admitted with a horizontal velocity component into the interface B and can easily pass the rag layer that tends to accumulate there. Thus, the dispersed liquid is admitted into the interface substantially without any of the continuous phase. Moreover, these droplets tend to wash away the rag that forms at the interface in that they flow horizontally. Any continuous phase carried into the settler descends to augment the layer of heavy phase beneath the interface B, and liquid from this layer flows back into the zone 32 through the downcomers 33 to maintain the interface B at a level determined by the valve controlling the discharge of heavy liquid phase from the bottom of the column. The interface level B may be varied slightly from the level of the opening 30 to regulate the admission of continuous phase into the settler, and the rag may be withdrawn periodically or continuously through the outlet 23a, or periodically with the light phase through the outlet 16a as described previously for Figs. 1 and 2.

In Fig. 4 the settler is similar to that of Fig. 3 but differs in that two inclined partition walls 29a and 29b are provided, leaving a slot-like opening 30a that extends across the column. The operation of this arrangement is like that described for Fig. 3, and like reference numbers designate like parts.

In Fig. 5 the column 1b has a top closure 3b with a horizontal partition wall 34 that is imperforate except for a central opening for the rotor shaft 2b and a downcomer tube 35 extending to a level beneath the partition wall. This wall divides the column into a settling zone 36 at the top and a zone of quiet flow 37 between the wall and the contact zone; the latter zone is in free communication with the quiet flow zone. A stationary tube 28 may optionally surround the part of the rotor shaft that extends through the settling zone. A conduit 15b having a flat nozzle 15a connects the top of the zone 37 with an intermediate level of the zone 36 for transferring liquid from the latter. Other reference characters indicate parts corresponding to those previously described with reference to Fig. 3.

The dispersion ascending from the contact zone through the zone of quiet flow 37 is enriched in the dispersed phase which is transported upwardly preferentially over the continuous phase. Partial coalescence may take place but no continuous layer of light phase forms at the top of zone 37. The enriched dispersion is conducted by conduit 15b into the settling zone, where it is discharged horizontally through the flat nozzle 15a which is arranged in plan similarly to the nozzle 15a in Fig. 2, and is disposed at the level at which it is intended to maintain the interface C. Layers of heavy and light liquid phases are maintained in the settler beneath and above the interface level by regulation of the rate of efflux of heavy liquid phase from the bottom of the column. The dispersed droplets readily coalesce and rise into the upper layer, from which light liquid is withdrawn through outlet 16a, while excess heavy phase returns from the settling zone into the zone 37 via downcomer 35.

We claim as our invention:

1. Process of separating the phases of a dispersion consisting essentially of first liquid phase dispersed in a continuous second liquid phase, said phases having different densities and said dispersion containing a minor amount of a substance that separates as a third phase that accumulates at the interface between continuous layers of said first and second phases upon settling, comprising the steps of: flowing said dispersion through a quiet flow zone in a direction toward which the first liquid phase tends to settle and at a velocity so low that droplets of first phase move substantially faster than the second liquid phase but sufficiently high to maintain the predominant part of said droplets in a dispersed state, thereby producing a modified dispersion wherein the first phase is concentrated in relation to the second phase; discharging second liquid phase from said quiet flow zone; maintaining continuous layers of said first and second liquid phases separated by an interface in a settling zone; withdrawing said modified dispersion from said quiet flow zone and admitting it with only a minor amount of the second liquid phase and with a substantial horizontal velocity component to said interface in the settling zone, whereby the droplets of the first liquid phase flow to the continuous layer of like liquid phase in the settling zone without vertical flow through said interface and without passage through any layer of said third phase that may collect at said interface; and discharging liquid phase from said layer thereof in the settling zone.

2. Process according to claim 1 including the added step of withdrawing second liquid phase from the layer thereof in the settling zone and admitting it to said quiet flow zone at a level displaced from said interface.

3. Process according to claim 1 wherein said flow of the dispersion through the quiet flow zone includes flow in contact with an inclined wall, thereby imparting a horizontal velocity component to the dispersion and effecting partial coalescence of said droplets of first liquid phase, said interface in the settling zone being maintained immediately contiguous said inclined wall at the extremity thereof in the said settling direction of first liquid phase.

4. Process for effecting contact between and subsequently separating two at least partially immiscible principal liquid phases having different densities and containing a minor amount of a substance that separates as a third phase and accumulates at the interface between continuous layers of said principal liquid phases upon settling, comprising the steps of: dispersing one of said principal liquid phases into a continuous phase of the other within a strong flow contacting zone and maintaining throughout all parts of said zone a movement of said phases rapid enough to prevent the formation of any interface between continuous layers of said principal liquid phases, thereby preventing the accumulation of the third phase and the deposition thereof on any parts within said zone;

withdrawing the resulting dispersion from said contacting zone; flowing said withdrawn dispersion through a quiet flow zone in a direction toward which the dispersed liquid phase tends to settle and at a velocity so low that droplets of the dispersed liquid phase move substantially faster than the continuous phase but sufficiently high to maintain the predominant part of said droplets dispersed in the continuous phase, thereby producing a modified dispersion wherein the dispersed liquid phase is concentrated in relation to the continuous phase; maintaining continuous layers of said principal liquid phases separated by an interface in a settling zone; withdrawing said modified dispersion from said quiet flow zone and admitting it with only a minor amount of said continuous liquid phase and with a substantial horizontal velocity component to said interface in the settling zone, whereby said droplets of the dispersed phase flow to the continuous layer of like liquid phase in the settling zone without vertical flow through said interface and without passage through any layer of said third phase that may collect at said interface; and discharging liquid phases from said layers in the settling zone.

5. Process according to claim 4 wherein said dispersal of one of the principal liquid phases is effected within a vertically elongated contacting zone, said one of the phases being dispersed and maintained in the dispersed state by means of a rotating body extending throughout essentially the full height of said zone, whereby the dispersed liquid phase settles through said contacting zone in said settling direction; the resulting dispersion is withdrawn from the contacting zone at the end thereof toward which said dispersed phase settles; and the continuous phase is withdrawn from the contacting zone at the opposite end thereof.

6. Process according to claim 5 wherein the part of said quiet flow zone opposite to said settling direction is in free communication with said contacting zone and continuous phase within the quiet flow zone is transferred from the latter zone into the contacting zone.

7. Process according to claim 5 wherein said dispersal of one of the principal liquid phases in the other is effected in a vertically elongated contacting zone and said one of the phases is maintained in the dispersed state throughout the height of said contacting zone, whereby the dispersed liquid phase settles through said contacting zone in the said settling direction; the resulting dispersion is withdrawn from the contacting zone at the end thereof toward which said dispersed phase settles; the continuous phase is withdrawn from the contacting zone at the opposite end thereof; the withdrawn dispersion is partly coalesced during said flow through the quiet flow zone by flow in contact with an inclined wall; and said interface in the settling zone is maintained immediately contiguous said inclined wall at the extremity thereof in the said settling direction.

8. Apparatus for separating the phases of a dispersion comprising: an enclosure defining a vertically elongated quiet flow chamber which is unobstructed and adapted for the slow flow of the dispersion with a vertical flow component; an enclosure defining a separate settling chamber wherein layers of liquid settled from said dispersion are maintained with a horizontal interface; means including an inlet for admitting said dispersion continuously to one end of said quiet flow chamber for flow therethrough; an outlet at the other end of the quiet flow chamber for withdrawing the dispersion in modified form after slow flow through the chamber and consequent concentration of the dispersed phase in said dispersion; an inlet passageway for said settling chamber opening thereinto at an intermediate level and in flow-receiving relation with said outlet of the quiet flow chamber; separate draw-off outlets for discharging settled liquids from said settling chamber communicating therewith respectively above and below said inlet passageway, at least one of said draw-off outlets being displaced horizontally from the inlet passageway, whereby the modified dispersion admitted to the settling chamber flows with a horizontal flow component toward said one outlet; and flow-control means on at least one of said draw-off outlets for regulating the rate of draw-off so as to maintain the said interface substantially at the level of the inlet passageway.

9. Apparatus according to claim 8 wherein the settling chamber is situated near the level of said outlet from the quiet flow chamber and the draw-off outlet of the settling chamber which is toward the inlet to the quiet flow chamber communicates with the latter chamber at a level displaced from said outlet thereof for the total return of one of the settled liquid to the quiet flow chamber.

10. Apparatus for separating the phases of dispersions comprising: an upright enclosure having a partition wall extending substantially across the enclosure and dividing the same into a quiet flow chamber and a settling chamber situated on opposite sides of the partition wall, said quiet flow chamber being vertically elongated and unobstructed for the slow flow of the dispersion with a vertical flow component; means including an inlet for admitting a dispersion to said quiet flow chamber at a level displaced vertically from said partition wall for flow through said chamber; a liquid passageway communicating with said quiet flow chamber near the said partition wall and with said settling chamber at an intermediate level thereof for withdrawing the dispersion in modified form from said quiet flow chamber after slow flow therethrough and consequent concentration of the dispersed phase and admitting said modified dispersion into the settling chamber; separate draw-off outlets for discharging settled liquids from said settling chamber communicating therewith respectively above and below said intermediate level, at least one of said draw-off outlets being displaced horizontally from the said liquid passageway, whereby the modified dispersion admitted to the settling chamber flows with a horizontal flow component toward said one outlet; and flow-control means on at least one of said outlets for regulating the rate of flow so as to maintain the interface between settled liquids in the settling chamber substantially at the said intermediate level.

11. In combination with the apparatus according to claim 10, an additional draw-off outlet for said settling chamber communicating therewith substantially at said intermediate level for discharging impurities that collect at said interface between settled liquids.

12. Apparatus according to claim 10 wherein said partition wall is inclined, the said liquid passageway being situated at a part of said partition wall remote from said inlet to the quiet flow chamber.

13. Apparatus according to claim 10 wherein said partition wall is substantially horizontal and the said liquid passageway comprises a conduit having the intake end thereof in communication with the quiet flow chamber at a level adjacent the partition wall and the discharge end thereof in communication with the settling chamber, said discharge end being situated at said intermediate level and disposed substantially horizontally.

14. Apparatus for bringing into contact with each other and subsequently separating two at least partially immiscible principal liquid phases of different densities containing a minor amount of impurity that separates from said phases as a third phase and accumulates at a level interface separating continuous layers of the principal liquid phases upon settling, comprising: liquid contactor having means for admitting the principal liquid phases to be contacted, dispersing means for dispersing one of said liquid phases in the other, a first outlet for discharging from said contactor a phase consisting predominantly of the continuous liquid phase and a second outlet for discharging a dispersion of the other principal liquid phase in the said continuous phase, said contactor containing agitating means for maintaining a strong flow therein and maintaining the liquid phases continuously in dispersion; enclosure defining a vertically elongated quiet flow chamber, said chamber being unobstructed for the slow flow of the dispersion with a vertical flow component and having one end thereof connected to said second outlet of the contactor; enclosure defining a separate settling chamber; a liquid passageway communicating with said quiet flow chamber at a level remote from the said one end thereof and with the settling chamber at an intermediate level thereof for withdrawing the dispersion in modified form from said quiet flow chamber after slow flow therethrough and consequent concentration of the dispersed phase and admitting said modified dispersion into the settling chamber; separate draw-off outlets for discharging settled liquids from the settling chamber communicating therewith respectively above and below said intermediate level, at least one of said draw-off outlets being displaced horizontally from the said liquid passageway, whereby the dispersion admitted to the settling chamber flows with a horizontal velocity component; and flow-control means on at least one of said outlets for regulating the rate of flow so as to maintain the interface between settled liquids in the settling chamber substantially at the said intermediate level.

15. Apparatus according to claim 14 wherein said quiet flow chamber and settling chamber are vertically juxtaposed and separated by a partition wall, and the draw-off outlet of the settling chamber which is toward the quiet flow chamber communicates with the latter chamber at a level displaced from said liquid passageway for the total return of one of said settled liquids thereto.

16. Apparatus for bringing into contact and subsequently separating two at least partially immiscible principal liquid phases of different densities containing a minor amount of impurity that separates as a third phase and accumulates at an interface separating continuous layers of said phases upon settling, comprising: an upright shell enclosing, in the order stated, a vertically elongated contacting chamber, a quiet flow chamber situated at one end of and in free communication with the contacting chamber, and a settling chamber, said shell containing a partition wall extending substantially across the shell to separate said quiet flow chamber from the settling chamber, said quiet flow chamber being unobstructed for the slow flow of a dispersion away from the contacting chamber; an upright rotor shaft in the contacting chamber mounted for rotation and having drive means; a plurality of vertically distributed liquid-engaging contacting elements on said shaft situated only within said contacting chamber adapted to produce strong flow and thereby to create and maintain therein a dispersion of one said principal liquid phase within the other; means for admitting said principal liquid phases to the contacting chamber; an outlet for the continuous liquid phase at the end of the contacting chamber remote from the quiet flow chamber; flow communication means for transferring the dispersion in modified form, after slow flow through the quiet flow chamber and consequent concentration of the dispersed phase, from a level in the quiet flow chamber remote to the contacting chamber to an intermediate level of the settling chamber; draw-off outlets for said settling chamber communicating therewith respectively above and below said intermediate level, the draw-off outlet toward the outlet of the contacting chamber being connected to return settled continuous phase liquid to said quiet flow chamber at a level spaced from the said flow communication means toward the contacting chamber; and flow-control means in at least one of said outlets for regulating the rate of flow so as to maintain the interface between settled liquids within the settling chamber substantially at said intermediate level.

17. The apparatus according to claim 16 wherein the said rotor shaft extends through said quiet flow chamber, partition wall and settling chamber, and is surrounded by a stationary sheath in said last-mentioned chambers.

18. The apparatus according to claim 16 wherein the said partition wall is inclined and has an opening at the level thereof farthest from the contacting chamber, the said opening constituting the said flow communication means for transferring modified dispersion.

19. The apparatus according to claim 16 wherein the said partition wall is substantially horizontal and the said flow communication means for transferring modified dispersion comprises a conduit having the intake thereof in communication with the quiet flow chamber at a level adjacent to the partition wall and the discharge thereof communicating with the settling chamber at the said intermediate level and disposed substantially horizontally.

References Cited in the file of this patent

UNITED STATES PATENTS

| | | |
|---|---|---|
| 1,208,534 | Foret | Dec. 12, 1916 |
| 1,651,328 | Edeleanu | Nov. 29, 1927 |
| 1,864,911 | Jodeck | June 28, 1932 |
| 2,148,460 | Haney | Feb. 28, 1939 |
| 2,580,010 | Fenske et al. | Dec. 25, 1951 |
| 2,601,674 | Reman | June 24, 1952 |